BEST AVAILABLE COPY

W. A. Ingalls.

Casting Screws.

No. 2849 Reissued Feb. 4, 1868

Witnesses
W. E. Means
Jas. W. Hewitt.

Inventor;
Wm. Allen Ingalls

BEST AVAILABLE COPY

UNITED STATES PATENT OFFICE.

WILLIAM ALLEN INGALLS, OF CHICAGO, ILLINOIS.

IMPROVED METHOD OF CASTING SCREWS.

Specification forming part of Letters Patent No. 54,733 dated May 15, 1866; Reissue No. 2,849, dated February 4, 1868.

*To all whom it may concern:*

Be it known that I, WILLIAM ALLEN INGALLS, of Chicago, in the county of Cook and State of Illinois, have invented a new, useful, and Improved Screw for Stools, Chairs, Presses, Vices, and other purposes, and my invention includes the mode of making the screw as well as the improved screw; and I do declare that the following is a full, clear, and exact description of my invention, reference being had to the accompanying drawings, making part of this specification, in which—

Figure 2:
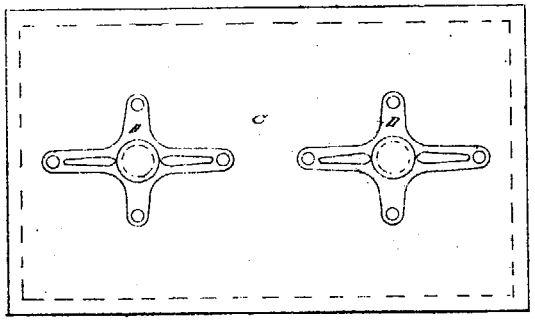
Figure 1:
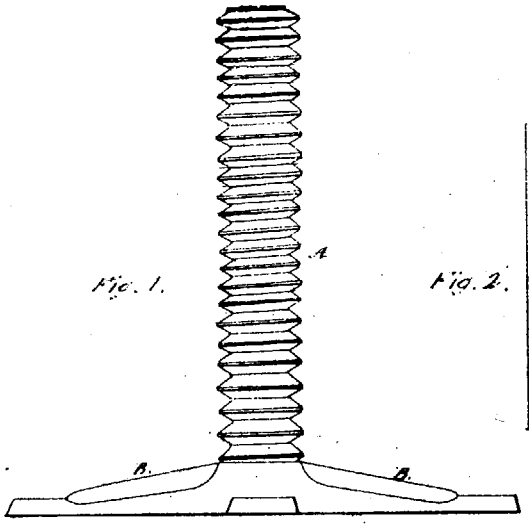
Figure 4:
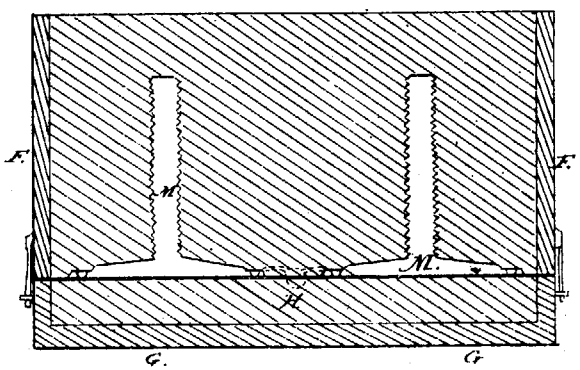
Figure 3:
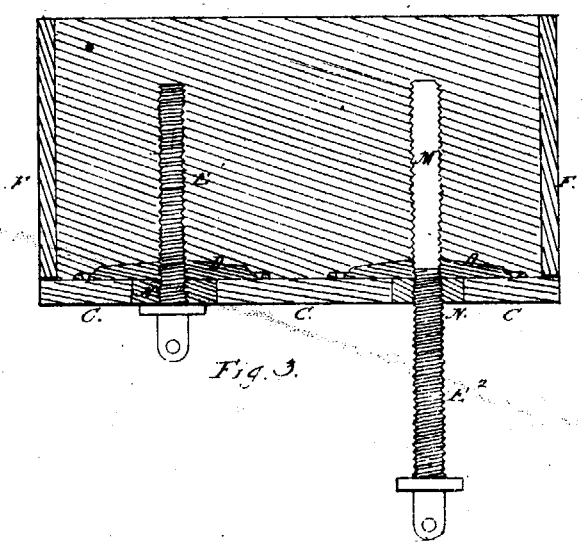

Figure 1 represents a view of the seamless screw. Fig. 2 represents a plan or top view of the pattern prepared for making the molds. Fig. 3 is a transverse section of the flask in which the mold is formed with one pattern withdrawn. Fig. 4 is a similar section, having the pattern removed and the molds ready for filling.

Similar letters of reference in the several figures denote the same parts as herein described.

The nature and object of my invention consists in producing a new and improved article of cast screws by casting them without seams or scars in a new and improved method or mode, so as to produce screws of a considerable size or even of a large size without seams or scars from the imperfect joining of the parts of the patterns and of the flasks or molds, which has heretofore been found impossible in casting screw of any considerable size and length.

By the use of my improved method screws of almost any size and adapted to almost all purposes for which such screws are used can be cheaply and expeditiously made, as all filing and fitting is rendered unnecessary.

To enable others skilled in the art to make and use my invention, I will now proceed to describe the same.

The mode of preparing the mold for casting the screw A with its head B, which is for a piano-stool in the form shown, is as follows: The patterns D for the head B are secured to a plank or other suitable support, C, into which, if of wood, a metallic block, N, is inserted, which, with the pattern D, when properly prepared, form a guide, through which the patterns of the screw are turned out of the mold. Through the pattern D and the metallic block N, arranged as shown in Fig. 3, or in any other suitable manner, is cut a female screw, whose diameter and threads correspond exactly with the diameter of and threads upon the screw-patterns E. These patterns are then screwed in through said female screw, as shown at E′ in Fig. 3. When the patterns are thus arranged the box F is placed upon said plank C and packed or tamped with any suitable molding-sand around and upon said patterns, so as to leave distinct and accurate impressions thereof in the sand when the patterns are removed.

After the sand has been properly packed, as aforesaid, the patterns are turned or screwed out from the sand, as shown at $E^2$ in Fig. 3, and the patterns being turned or screwed out to or through the guide-nut formed by the block N and pattern D, the operator is enabled to withdraw the patterns D from the mold without destroying or injuring the threads of the molds.

The screw A, hereinbefore described and represented at Fig. 1, is provided with a head, B, cast with four lugs or arms, whereby the screw may be attached to a seat for stools or other purposes; but screws may be cast in this manner, whether provided with such a head or not or without any head, and the threads may be formed with square shoulders or with any desired angle or curve.

The screw-patterns may be of iron or any other suitable material, and may be turned out of the mold by inserting a pin in the hole shown near the collar or by a wrench or in any other suitable manner.

When the patterns are withdrawn, as shown at $E^2$ in Fig. 3, the plank C with the patterns are removed, and the molds M are then backed by a surface of molding-sand contained in a box, G, which is hooked to the box F, as shown in Fig. 4, or otherwise suitably secured.

In Figs. 3 and 4 the molds are turned down upon one side to allow the patterns to be removed and the molds to be filled, which is effected by pouring the metal into a hole, H, which has gates leading into the molds M near or at the bottom thereof, to prevent washing while the metal is being poured.

Having thus fully described my invention, what I claim as new, and desire to secure by Letters Patent, is—

1. The mode herein described for casting seamless screws.

2. The screw herein described, as a new and improved article of manufacture.

WM. ALLEN INGALLS.

In presence of—
E. A. WEST,
J. H. WHIPPLE.